Mar. 13, 1923.

J. B. LA PIERRE.
STEERING WHEEL.
FILED SEPT. 8, 1922.

1,448,132.

Witness:
U. K. Olson
Wm. E. Anderson

Inventor:
Julian B. La Pierre,
By Rummler & Rummler

Patented Mar. 13, 1923.

1,448,132

UNITED STATES PATENT OFFICE.

JULIAN B. LA PIERRE, OF CHICAGO, ILLINOIS.

STEERING WHEEL.

Application filed September 8, 1922. Serial No. 586,833.

*To all whom it may concern:*

Be it known that I, JULIAN B. LA PIERRE, a citizen of the United States of America, and a resident of Chicago, county of Cook, and State of Illinois, have invented a new and useful Improvement in Steering Wheels, of which the following is a specification.

This invention relates to steering wheels for motor-driven vehicles and the like, and particularly to the type of steering wheels in which a non-metallic rim is rigidly secured to the arms of a metallic spider as shown in Patent No. 1,403,968, issued to me on January 17, 1922.

In the construction of automobile steering wheels, it is desirable to produce an article which is ornamental in appearance, and it is also necessary that it be of sufficient strength to withstand the strain and abuse to which it is likely to be subjected. It is also desirable that the connections between the spider arms and rim be such that the rim will be free from projections and patching and will present no obstruction to the free sliding movement of the hands around the wheel rim.

The main objects of this invention are to provide an improved form and arrangement of parts for securing the ends of the spider arms to the rim without cutting away any part of the rim at the points where the spider arms are attached; and to provide means for assembling the rim and spider in wheels of the type of Patent No. 1, 403,968, without necessitating the flexing of the spider arms.

An illustrative embodiment of this invention is shown in the accompanying drawings, wherein—

In assembling a steering wheel constructed in accordance with my said Patent No. 1,403,968, the rim is placed in a suitable support and the spider is placed in a press whereby its arms are flexed enough to allow it to be inserted into place within the rim. The press is then operated to force the spider arms outwardly so as to bring the pads into engagement with the rim. This method of assembly is entirely satisfactory for steering wheels in which the spider arms may be readily flexed. However, many of the steering wheels which are now in use, and especially certain types equipped with locking devices, include spiders having arms which are of such cross sectional shape as to practically preclude the flexing of the spider arms.

A distinctive feature of the present invention is the fact that the pads of the spider arms extend both above and below the central plane of the rim so as to partly embrace the rim and securely hold it against up and down movement independently of the fastening screws, and the fact that the rim is so shaped on its inner periphery as to allow the spider to be inserted at one position and then rotated in the plane of the rim until it comes to a securing bearing at the desired bearing points.

In the form shown, the steering wheel comprises an annular non-metallic rim 1, which is rigidly secured to a metallic supporting spider 2, having a hub 3, and a plurality of radially disposed arms 4.

Figure 3:
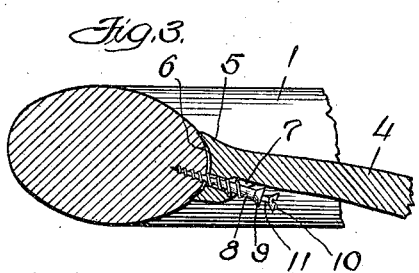
Fig. 3 is an enlarged fragmentary detail in section.
Figure 4:
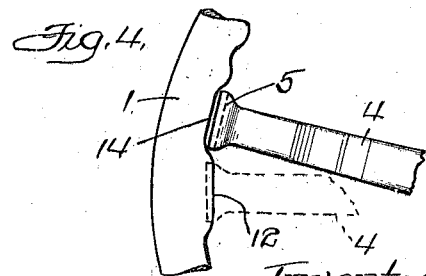
Fig. 4 is a fragmentary view in elevation, showing one of the spider arms located in a depression adjacent one of the bearing surfaces of the rim.

The outer ends of the arms 4 are formed to provide pads 5, integral with the spider and having bearing surfaces or seats 6, which bear against and firmly grip the annular rim at regular intervals along its inner periphery. In order to conform to the shape of the rim at the point of connection, so as to insure tight fitting joints, the bearing surfaces 6 are curved longitudinally in the plane of the wheel and also transversely thereto. The transverse curvature has a radius which is slightly less than the radius of a cross section of the annular rim, shown exaggerated in Figure 3 so as to permit the knife-like edges of the pads to bite into the rim so that the joint presents a smooth and ornamental appearance.

A counter-sunk aperture 7 extends through each of the pads on the lower side of the spider arm to receive a screw 8 whereby the rim is rigidly secured to the spider. The screws 8 are preferably formed with two heads 9 and 10 connected by a narrow neck 11. The lower head is shaped so as to completely fill the counter-sink, and the outer head 10 has the usual slot to accommodate a screw driver. The screws are forced into the rim until the inner head 9 becomes seated in the counter-sunk aperture. By means of a cutting tool or by the twisting of the neck through a continued effort to turn the screw after it becomes seated the outer head is sheared off and the inner head may be then filed or ground down and polished so as to be flush with the face of the pad.

Figure 1:
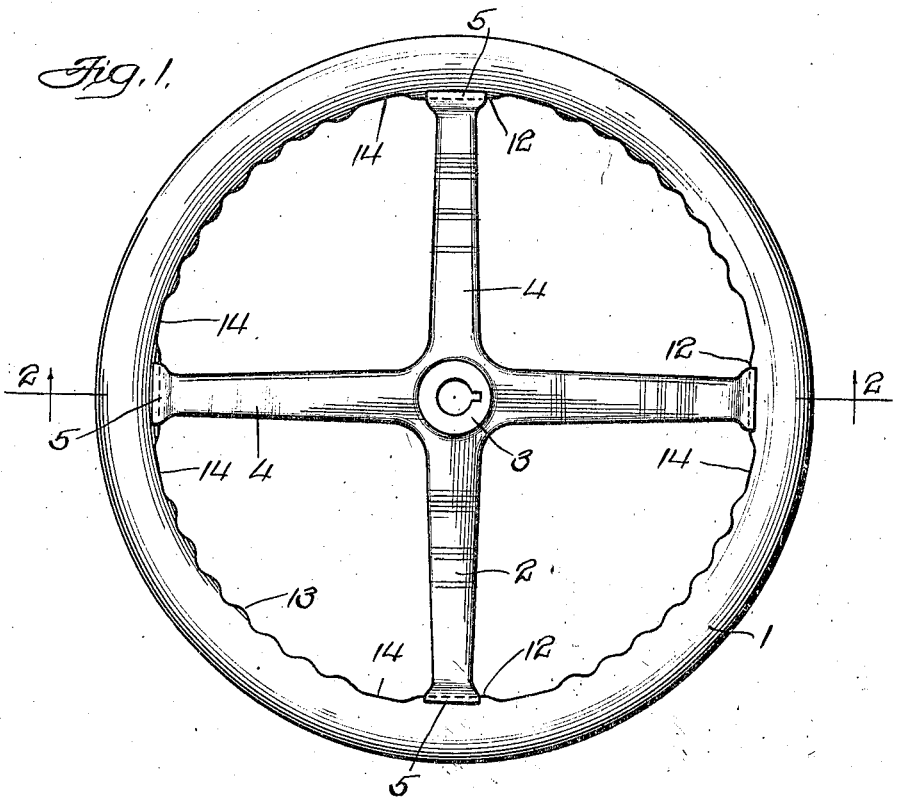
Figure 1 is a plan of a steering wheel constructed in accordance with this invention.
Figure 2:
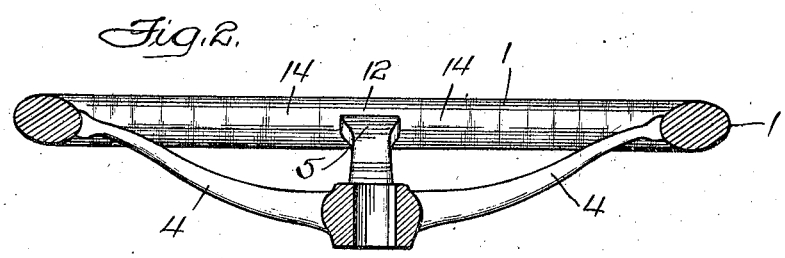
Fig. 2 is a transverse section taken on the line 2—2 of Figure 1.

In the form shown, the rim 1 is oval in radial cross section and, formed at intervals on its inner periphery, is a plurality of bearing surfaces 12 arranged for interfitting engagement with the concave seats 6 of the pads 5. The portions of the rim between the bearing surfaces 12 are corrugated, as shown in Figure 1, to provide the usual finger grips 13. The furrows of the corrugations are arranged so as to provide a recess or depression 14 on each side of each of the bearing surfaces 12. In order to present a uniform and ornamental appearance, the depressions 14 are herein shown located on both sides of the bearing surfaces 12, but one of such depressions adjacent each bearing surface is sufficient to carry out the purpose of this invention.

In assembling the wheel, the rim is placed in a suitable support, not shown, having suitable lining, to prevent marring of the finish. The spider is then inserted axially within the rim by placing the pads 5 in one set of the depressions 14. Then the spider is partially rotated relative to the rim so as to bring the bearing surfaces 12 and pads 5 into snug interfitting engagement. The screws 8 are then inserted to permanently secure the pads to the rim.

Although but one specific embodiment of this invention has been herein shown and described it will be understood that numerous details of the construction shown may be altered or omitted without departing from the spirit of this invention as defined by the following claims.

I claim:

1. A steering wheel comprising a spider including a plurality of supporting arms having bearing surfaces at their ends, and a rim having bearing surfaces arranged on its inner periphery for interfitting engagement with said arms, said rim bearing surfaces being offset radially inward from adjacent portions of said rim whereby said spider and rim may be assembled by placing said arms in the plane of said rim in said adjacent portions and rotating said rim and spider relatively so as to bring said arms and the bearing surfaces of said rim into interfitting engagement.

2. A steering wheel comprising a spider including a plurality of supporting arms having pads at their ends, and a rim having bearing surfaces arranged on its inner periphery for interfitting engagement with said pads, said rim having a recess formed on its inner periphery adjacent each of said bearing surfaces whereby said spider and rim may be assembled by placing said pads in the plane of said rim in said recesses and rotating said rim and spider relatively so as to bring said pads and bearing surfaces into interfitting engagement.

3. A steering wheel comprising a spider including a plurality of supporting arms having pads at their ends, and a rim having bearing surfaces arranged on its inner periphery for interfitting engagement with said pads, the portions of said inner periphery between said bearing surfaces being corrugated to form finger grips, the corrugations of said portions being arranged to provide a depression adjacent each of said bearing surfaces whereby said spider and rim may be assembled by placing said pads in the plane of said rim in said depressions to permit said rim and spider to be relatively rotated so as to bring said pads and bearing surfaces into interfitting engagement.

4. A steering wheel comprising a spider having a plurality of supporting arms, pads formed on the ends of said arms and having concave seats, and a rim having convex bearing surfaces arranged at intervals on its inner periphery for interfitting engagement with the seats of said pads, said bearing surfaces being offset radially inward from adjacent portions of said inner periphery whereby said spider and rim may be assembled by placing said pads in the plane of said rim in said adjacent portions to permit said rim and spider to be relatively rotated so as to bring said bearing surfaces and seats into interfitting engagement.

Signed at Chicago this 24th day of February, 1922.

JULIAN B. LA PIERRE.